United States Patent
Nakatsukasa et al.

(10) Patent No.: US 6,413,421 B1
(45) Date of Patent: Jul. 2, 2002

(54) FILTER DEVICE WITH MAGNETIC MEMBER

(75) Inventors: Masami Nakatsukasa, Handa; Kazuo Tominaga, Fuji, both of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/629,947

(22) Filed: Aug. 1, 2000

(30) Foreign Application Priority Data

Aug. 4, 1999 (JP) .......................... 11-220830

(51) Int. Cl.[7] .............................. B01D 35/06
(52) U.S. Cl. ...................... 210/223; 184/6.25
(58) Field of Search ................ 210/223, 695; 184/6.25

(56) References Cited

U.S. PATENT DOCUMENTS

| 4,773,995 A | 9/1988 | Kondo |
| 5,423,983 A | 6/1995 | Chiang |
| 5,714,063 A | 2/1998 | Brunsting |

FOREIGN PATENT DOCUMENTS

| CA | 2118446 | 4/1996 |
| EP | 0 702 993 B1 | 3/1996 |
| JP | U-5-95614 | 5/1992 |
| JP | 11-156120 | 6/1999 |

OTHER PUBLICATIONS

PTO 2002–0139 Patent and Trademark Office Translation of JP–U–5–95614.*

* cited by examiner

Primary Examiner—David A. Reifsnyder
(74) Attorney, Agent, or Firm—Nixon & Vanderhye PC

(57) ABSTRACT

In an oil filter for filtering oil from an internal combustion engine, a protection member is inserted into an inner peripheral side of a filter element assembly, a recess portion is provided in the protection member to be recessed from an outer peripheral surface of the protection member, and a magnetic member having a thickness approximately equal to a recess dimension of the recess portion is disposed in the recess portion. Thus, a holding state of the magnetic member between the recess portion of the protection member and the filter element assembly can be sufficiently maintained without depending on a contact state between the magnetic member 31 and the recess portion of the protection member. Thus, the oil filter can filter impurities mixed in oil and can remove very fine iron powder contained in oil, while the holding state of the magnetic member can be sufficiently maintained with a simple structure.

21 Claims, 2 Drawing Sheets

FILTER DEVICE WITH MAGNETIC MEMBER

CROSS-REFERENCE TO RELATED APPLICATION

This application is related to and claims priority from Japanese Patent Application No. Hei. 11-220830 filed on Aug. 4, 1999, the contents of which are hereby incorporated by reference.

BACKGROUND OF THE INVENTION

1. Field of the Invention

The present invention relates to a filter device with a magnetic member, which can filter impurities mixed in a fluid and can remove a very fine iron powder contained in the fluid.

2. Description of Related Art

In a conventional oil filter having a magnetic member described in JP-A-11-156120, a protection member having plural holes is provided inside an element assembly having a filter element, and the magnetic member is held by an engagement claw of a holder provided at an inner peripheral side of the protection member. However, it is necessary to assemble the magnetic member into the holder, and assembling steps of the filter device becomes trouble. Further, in a case where the oil filter is used for an internal combustion engine, when the magnetic member or the engagement claw of the holder falls away from the protection member due to vibrations in the internal combustion engine, an oil passage within the oil filter may be closed, or an oil passage within the internal combustion engine may be closed after the fallen part moves into the internal combustion engine.

SUMMARY OF THE INVENTION

In view of the foregoing problems, it is an object of the present invention to provide a filter device provided with a magnetic member, in which a holding state of the magnetic member can be sufficiently maintained with a simple structure.

According to the present invention, in a filter device with a magnetic member, an approximate cylindrical protection member is disposed to be inserted into an inner space defined by an approximate cylindrical inner peripheral surface of an element assembly having a filter element for filtering a fluid, a recess portion recessed from an outer peripheral surface of the protection member toward an inner radial side is provided in the protection member, and the magnetic member is disposed to be joined to the recess portion and to be close to the inner peripheral surface of the element assembly. Thus, a holding state of the magnet member can be sufficiently maintained without depending on a contact state between the magnetic member and the recess portion. Accordingly, the filter device with the magnetic member can filter impurities mixed in oil and can remove very fine iron powder contained in oil, while the holding state of the magnetic member can be sufficiently maintained with a simple structure.

Preferably, the protection member is made of a ferromagnetic material. Therefore, when the magnetic member contacts the protection member, the protection member is magnetized, and removing performance of the very fine iron powder contained in the-fluid can be further improved.

More preferably, the magnetic member has a dimension in a radial direction of the protection member, approximately equal to a recessed dimension of the recess portion in the radial direction. Therefore, the magnetic member can be accurately sufficiently held between the recess portion of the protection member and the element assembly with a simple structure.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings. In the present invention, a filter device with a magnetic member is typically applied to an oil filter 100 for an internal combustion engine.

Figure 1:
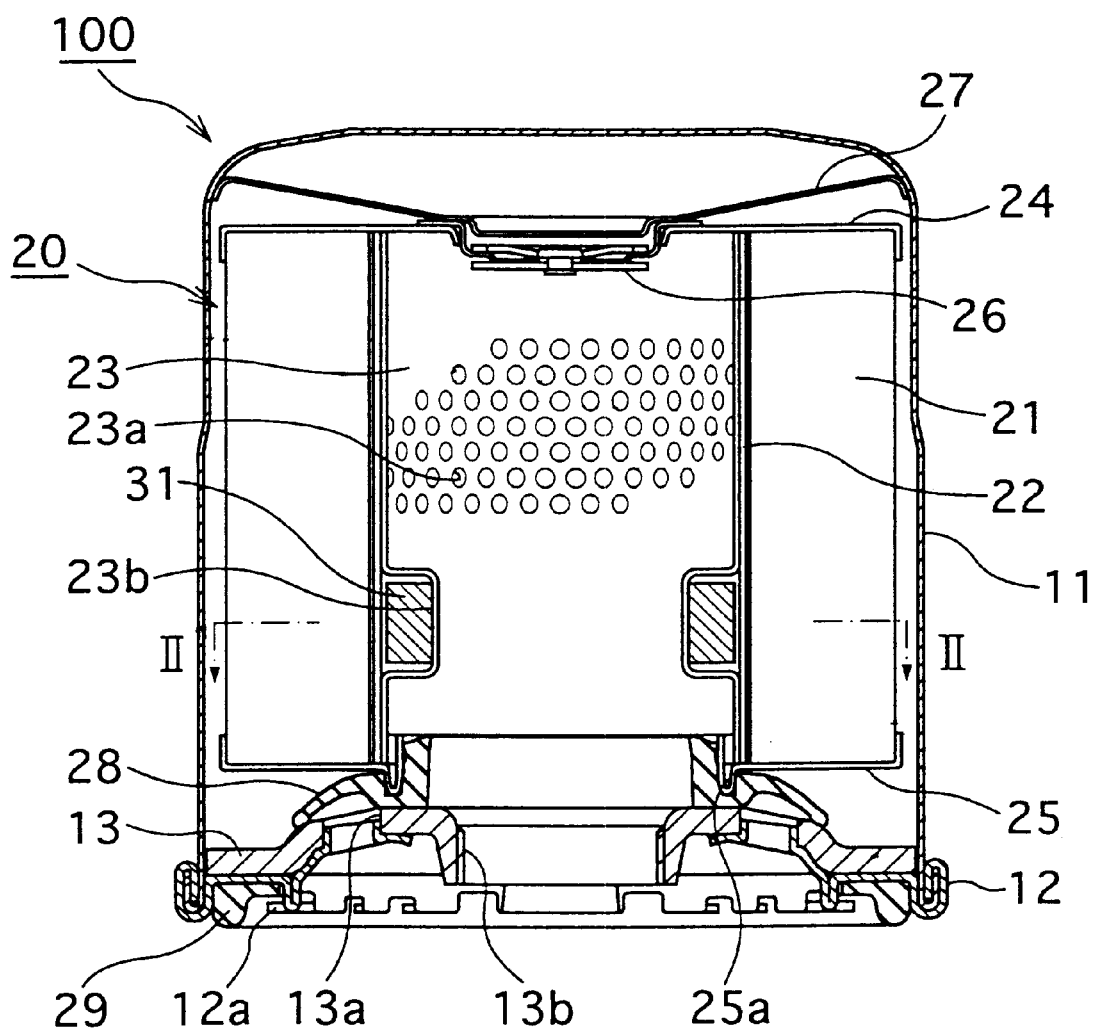
FIG. 1 is a schematic sectional view showing an entire structure of an oil filter for an internal combustion engine, according to a preferred embodiment of the present invention.
Figure 2:
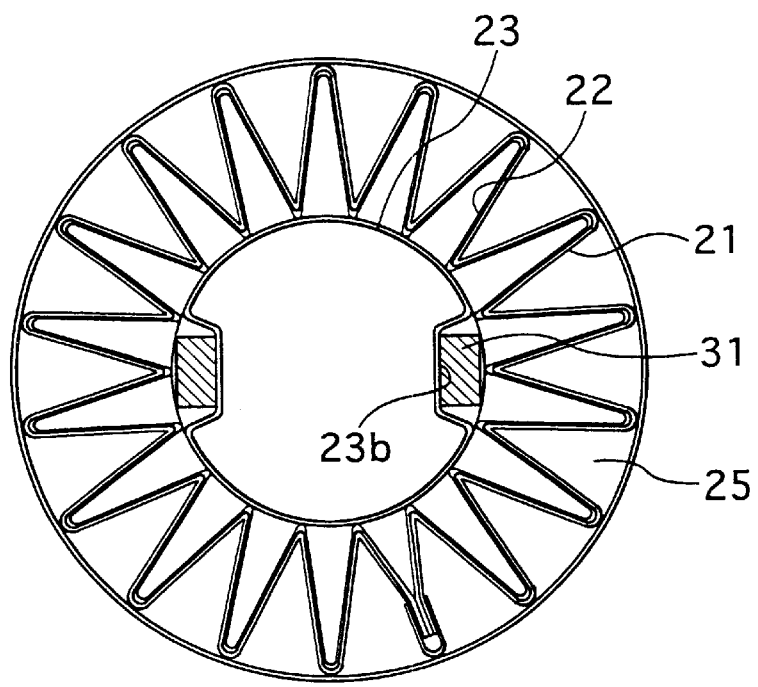
FIG. 2 is a cross-sectional view taken along line II—II in FIG. 1.

As shown in FIG. 1, the oil filter 100 includes a cylindrical filter case 11 made of metal and having one-side closed end (i.e., upper side end in FIG. 1), a bottom plate 12 integrated to the filter case 11, and a reinforcement plate 13 attached to an inner surface of the bottom plate 12. The bottom plate 12 is made of metal, and an outer peripheral end part thereof is bent to fasten an opened end of the filter case 11. The reinforcement plate 13 is also made of metal. An element sub-assembly 20 (hereinafter, referred to as element S/A 20) is disposed within the filter case 11. The element S/A 20 includes a filter element 21 in which a filter paper is disposed along a reinforcement net 22 as shown in FIG. 2. A protection member 23 is disposed inside the filter element S/A 20 (i.e., inside the protection net 22), and upper and lower end plates 24, 25 are disposed at upper and lower sides of the protection member 23 and the element S/A 20 to form a sealed space.

The protection member 23 is made of an iron metal, and is formed into an approximate cylindrical shape to be inserted into the element S/A 20. Plural holes 23a through which purified oil from the filter element 21 passes are provided in a side peripheral wall of the protection member 23, and a recess portion 23b recessed from an outer peripheral surface of the protection member 23 to an inner radial side of the protection member 23 is formed in the protection member 23 at a predetermined position. A magnet member 31 formed into a columnal shape or a rectangular parallelopiped shape contacts the recess portion 23b of the protection member 23 by a magnetic force to be joined to each other. In this embodiment, the magnetic member 31 is made of a neodymium-iron-boron compound (Nd—Fe—B compound) or a samarium-cobalt compound (Sm—Co compound), so that magnetic force of the magnetic member 31 is not demagnetized even when the oil filter 100 for an internal combustion engine is used under a high temperature condition. A relief valve 26 is disposed to close an upper side end of the protection member 23, and is biased toward the bottom plate 12 by an element support spring 27 disposed at the one side closed end (i.e., upper side end in FIG. 1) of the filter case 11. Therefore, a base side part of a check valve 28 made of ribber is pressed to the reinforcement plate 13 by a cylindrical end portion 25a protruding from the lower end plate 25 downwardly.

Plural oil inlets 13a for introducing oil into the filter element 21 of the element S/A 20 are provided in the reinforcement plate 13, and an oil outlet 13b for discharging purified oil is provided by burring in the reinforcement plate 13 at an approximate center to protrude to an outside of the oil filter 100. The bottom plate 12 is fitted by using the oil inlets 13a. An inner peripheral surface of the oil outlet 13b of the reinforcement plate 13 is formed to have a screw shape, and is used as a fixed female screw when the oil filter 100 is attached to the internal combustion engine. A rubber gasket 29 is held in the bottom plate 12 using plural claw portions 12a formed in the bottom plate 12. In this embodiment, the oil outlet 13b is formed to protrude to an outside of the oil filter 100. However, the oil outlet 13b may be formed to protrude to an inside of the oil filter 100.

An assembling state of the filter element 21, the protection member 23, the magnet member 31 and the like will be now described in detail with reference to FIG. 2. As shown in FIG. 2, a filter paper having a predetermined thickness is provided along the outer peripheral surface of the reinforcement member 23 which is formed by bending to have a star shape, so that the element S/A 20 is formed. The recess portion 23b is formed in a part of the outer peripheral wall portion of the protection member 23 to be recessed from the outer peripheral surface to the inner radial side by a dimension approximately equal to a thickness of the magnet portion 31. The magnetic member 31 contacts the recess portion 23b by the magnetic force. Therefore, hardly a clearance is formed in a radial direction between the reinforcement net 22 of the filter element 21 and the magnet member 31 joined to the recess portion 23b of the protection member 23. Accordingly, even when a contact state between the magnet member 31 and the protection member 23 is shifted, the magnet member 31 does not fall away from the recess portion 23b.

In the embodiment, when the end plates 24, 25, the end support spring 27 and the filter case 11 are made of iron metal in addition to the protection member 23, an entire part of the oil filter 100, made of iron metal, is magnetized by the magnetic member 31, so that very fin iron powder contained in oil is further readily removed.

Next, operation and functions of the oil filter 100 will be described. When oil can pass through the filter element 21 of the element S/A 20 and a pressure difference between upstream and downstream sides of the element S/A 20 in an oil flow is smaller than a predetermined pressure, dirty oil from the internal combustion engine is introduced into the oil filter 100 from the oil inlets 13a through the check valve 28. The dirty oil is purified during passing through the filter element 21 of the element S/A 20, and very fine iron powder contained in oil is removed by the magnetic member 31, the magnetized protection member 23 and the like. Thereafter, purified oil having passed through the plural holes 23a of the protection member 23 returns the internal combustion engine from the oil outlet 13b.

On the other hand, even when the filter element 21 of the element S/A 20 is clogged or even when viscosity of oil becomes extremely high, dirty oil from the internal combustion engine is introduced into the oil filter 100 from the oil inlets 13a through the check valve 28. However, the dirty oil is difficult to pass through the filter element 21 of the element S/L 20. In this case, when a pressure difference between upstream and downstream sides of the element S/A 20 is increased to a predetermined pressure, the relief valve 26 is opened. Therefore, dirty oil introduced into the filter oil 100 returns to the internal combustion engine from the oil outlet 13b without passing through the filter element 21 of the element S/A 20.

Figure 3:
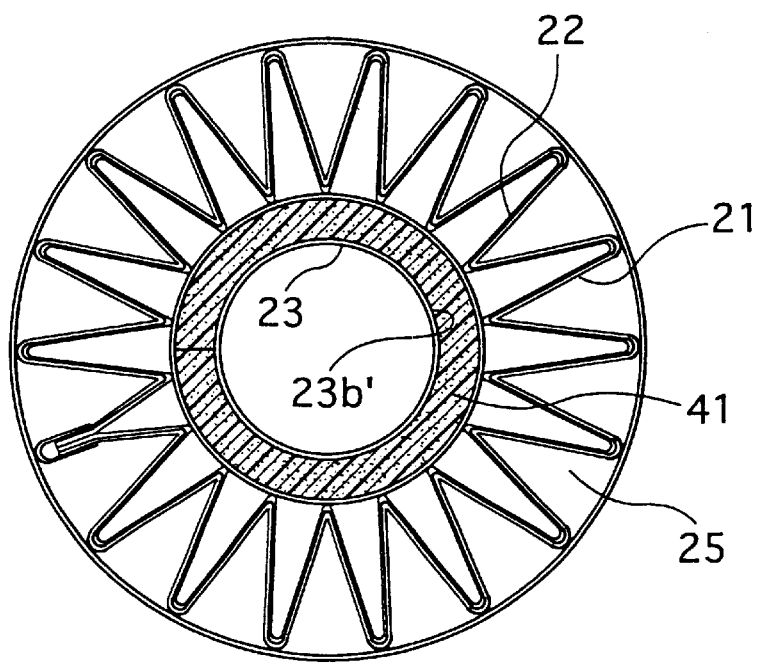
FIG. 3 is a cross-sectional view corresponding to FIG. 2, showing an oil filter for an internal combustion engine according to a modification of the embodiment.

FIG. 3 is a cross-sectional view taken along line II—II in FIG. 1, showing a modification of the first embodiment. As shown in FIG. 3, a part of the outer peripheral wall of the protection member 23 is removed over an entire circumference to form a recess portion 23b' over an entire circumference at a predetermined position in an axial direction of the protection member 23. A magnetic member 41 having a thickness approximately equal to a recess dimension of the recess portion 23b' is wound around the entire circumference of the recess portion 23b' to contact the recess portion 23b' of the protection member 23. Therefore, a clearance is hardly formed between the magnet member 41 joined to the recess portion 23b' of the protection member 23 and the reinforcement net 22 of the filter element 21. Therefore, similarly to the above-described embodiment, even when a contact state between the magnet member 41 and the protection member 23 is shifted, the magnet member 41 does not fall away from the recess portion 23b. Further, when the magnetic member 41 is made of plastic resin, a damage due to vibrations in the internal combustion engine can be prevented.

According to the embodiment of the present invention, the oil filter 100 includes the element S/A 20 having the approximately cylindrical doughnut-like filter element 21, the protection member 23 having plural holes 23a on the side peripheral wall, and the magnetic member 31 (41) inserted into the recess portion 23b (23b') to contact the recess portion 23b (23b') formed in a part of the outer peripheral wall of the protection member 23. That is, when the magnetic member 31 (41) is inserted into the recess portion 23b (23b'), the magnetic member 31 (41) is positioned close to the inner peripheral surface of the reinforcement net 22 of the filter element 21. Accordingly, the magnetic member 31 (41) sufficiently held between the recess portion 23b (23b') of the protection member 23 and the inner peripheral surface of the element S/A 20, without depending on the contact state between the magnetic member 31 (41) and the recess portion 23b (23b') of the protection member 23. As a result, in the filter device with a magnetic member according to the present invention, impurities mixed in oil can be filtered, very fine iron powder contained in oil can be removed with a simple structure, and the magnetic member 31 (41) is readily held. The protection member 23 is formed by a ferromagnetic material such as the iron metal. Therefore, when the magnetic member 31 (41) contacts the protection member 23, the protection member 23 is also magnetized, and the removing performance of very fine iron powder contained in oil can be further improved.

Although the present invention has been fully described in connection with the preferred embodiment thereof with reference to the accompanying drawings, it is to be noted that various changes and modifications will become apparent to those skilled in the art.

For example, in the above-described embodiment, the protection member 23 is made of an iron metal. However, the protection member 23 may be made of a non-iron metal or may be made of plastic resin. In this case, the magnetic member 31 (41) is bonded to the recess portion 23b (23b') of the protection member 23 by an adhesive.

In the above-described embodiment, the present invention is typically applied to the oil filter 100 for an internal combustion engine; however, may be applied to a fuel filter for an internal combustion engine.

Such changes and modifications are to be understood as being within the scope of the present invention as defined by the appended claims.

What is claimed is:

1. A filter device comprising:
   an element assembly having a filter element for filtering a fluid, said element assembly having an approximately cylindrical inner peripheral surface defining an inner space;
   a protection member disposed to be inserted into said inner space, said protection member including an approximate cylindrical side peripheral wall having a plurality of holes through which the fluid passes, a part of said side peripheral wall being recessed to an inner radial side to define a recess portion on an outside of said side peripheral wall; and
   a magnetic member disposed in said recess portion to contact said side peripheral wall, said magnetic member being disposed close to said inner peripheral surface of said element assembly.

2. The filter device according to claim 1, wherein said protection member is made of a ferromagnetic material.

3. The filter device according to claim 1, wherein said magnetic member has a dimension in a radial direction of said protection member, approximately equal to a dimension of said recess portion in the radial direction.

4. The filter device according to claim 1, wherein:
   said element assembly includes a reinforcement net for reinforcing said filter element;
   said reinforcement net is disposed at an inner peripheral side of said filter element; and
   said magnet member is disposed in said recess portion to approximately contact said reinforcement net.

5. The filter device according to claim 4, wherein said reinforcement net is made of a ferromagnetic material.

6. The filter device according to claim 1, wherein said recess portion is provided in a part of said side peripheral wall of said protection member in a circumferential direction of said protection member.

7. The filter device according to claim 1, wherein said recess portion is provided at a predetermined position of said side peripheral wall of said protection member in an axial direction of said protection member over an entire circumferential surface in a circumferential direction of said protection member.

8. The filter device according to claim 7, wherein said magnetic member has a doughnut shape, and is disposed to contact said protection member.

9. The filter device according to claim 1, wherein said element assembly has an approximate cylindrical outer peripheral surface.

10. The filter device according to claim 1, wherein said magnetic member is made of a neodymium-iron-boron compound (Nd—Fe—B compound).

11. The filter device according to claim 1, wherein said magnetic member is made of a samarium-cobalt compound (Sm—Co compound).

12. The filter device according to claim 1, wherein said side peripheral wall of the protection member defines an inner space into which the fluid flows through said holes after passing through said filter element.

13. The filter device according to claim 12, wherein said inner space of said side peripheral wall extends in an axial direction of said protection member so that the fluid flowing through said holes passes through said inner space of said side peripheral wall in the axial direction.

14. The filter device according to claim 1, wherein said magnetic member is held in said recess portion radially between said side peripheral wall and said filter element.

15. The filter device according to claim 1, wherein
   said recess portion is defined by said side peripheral wall outside said side peripheral wall to have a first wall part extending substantially in an axial direction of said protection member and two second wall parts extending substantially in a radial direction of said protection member at both ends of said first wall part; and
   said magnetic member is disposed in said recess portion to contact at least said first wall part.

16. A filter device comprising:
   a filter assembly including a filter element for filtering a fluid, said filter assembly having an inner peripheral surface defining an inner space;
   an approximate cylindrical protection member disposed in said inner space, said protection member defining an interior volume and having a plurality of holes defined therethrough for fluid passage between an outside of said protection member and said interior volume, said protection member including a wall having an inner surface facing said interior volume and an outer surface facing said outside of said protection member, a recessed portion being defined in said wall, recessed toward said interior volume to define a recess in said outer surface that is separated from said interior volume by said wall; and
   a magnetic member disposed in said recess portion to contact said outer surface of said wall.

17. A filter device as in claim 16, wherein said wall is an approximate cylindrical side peripheral wall having said plurality of holes defined therethrough.

18. A filter device according to claim 16, wherein said magnetic member has a dimension in a radial direction of said protection member, approximately equal to a recessed dimension of said recessed portion in the radial direction.

19. A filter device according to claim 16, wherein:
   said filter assembly includes a reinforcement net for reinforcing said filter element;
   said reinforcement net is disposed at an inner peripheral side of said filter element; and
   said magnet member is disposed to approximately contact said reinforcement net.

20. A filter device according to claim 16, wherein said recessed portion comprises a groove extending in a circumferential direction of said wall.

21. A filter device according to claim 20, wherein said recessed portion extends about an entire circumference of the protection member and along a predetermined portion of an axial length of the protection member.

* * * * *